(12) United States Patent
Guoin

(10) Patent No.: US 10,875,803 B1
(45) Date of Patent: *Dec. 29, 2020

(54) HYPER-OXYGENATED SOAKING SPA SYSTEM

(71) Applicant: PERFECT WATER WORLDWIDE, LLC, Montecito, CA (US)

(72) Inventor: Kenneth J. Guoin, Santa Barbara, CA (US)

(73) Assignee: PERFECT WATER WORLDWIDE, LLC, Montecito, CA (US)

(*) Notice: Subject to any disclaimer, the term of this patent is extended or adjusted under 35 U.S.C. 154(b) by 300 days.

This patent is subject to a terminal disclaimer.

(21) Appl. No.: 15/727,470

(22) Filed: Oct. 6, 2017

(51) Int. Cl.
*C02F 9/00* (2006.01)
*C02F 1/32* (2006.01)
*C02F 1/34* (2006.01)
*C02F 1/78* (2006.01)
*C02F 1/42* (2006.01)
(Continued)

(52) U.S. Cl.
CPC ............ *C02F 9/00* (2013.01); *A23L 2/74* (2013.01); *B01D 61/08* (2013.01); *C02F 1/283* (2013.01); *C02F 1/32* (2013.01); *C02F 1/34* (2013.01); *C02F 1/42* (2013.01); *C02F 1/44* (2013.01); *C02F 1/441* (2013.01); *C02F 1/442* (2013.01); *C02F 1/78* (2013.01); *C02F 5/083* (2013.01); *A61H 2033/0008* (2013.01); *C02F 2209/03* (2013.01)

(58) Field of Classification Search
CPC .. C01B 3/12; C01B 3/58; C01B 3/025; C01B 3/0021; C01B 3/36; C01B 5/00; A61H 2033/0008; A23L 2/74; C02F 1/32; C02F 1/441; C02F 5/083; C02F 1/34; C02F 1/42; C02F 1/44; C02F 1/442; C02F 1/78; C02F 1/283; C02F 9/00; C02F 2209/03; B01D 61/08; A61K 9/00; A61K 9/0014; A61K 33/00

See application file for complete search history.

(56) References Cited

U.S. PATENT DOCUMENTS 2,907,174 A 10/1959 Hendal
4,230,571 A 10/1980 Dadd
(Continued)

FOREIGN PATENT DOCUMENTS

CN 203606310 U 5/2014

OTHER PUBLICATIONS

Barret, S., FTC Attacks 'Stabilized Oxygen Claims,' accessed at https://www.quackwatch.org/04ConsumerEducation/News/vitamino. html May 2000. 3 pages.
(Continued)

*Primary Examiner* — John Kim
(74) *Attorney, Agent, or Firm* — Steinfl + Bruno LLP

(57) ABSTRACT

A self-contained water system that provides single point hyper-oxygenated water delivery to a soaking vessel, part of a conventional soaking spa, is presented. The self-contained water system purifies incoming water and restructures the purified water to deliver purified, alkaline, ionized, mineral-rich, and oxygen-rich water. Dissolved oxygen concentration of the water in the soaking vessel can be controlled and maintained at a desired high concentration value, in a range of 10 mg per liter to 50 mg per liter, for water that is at a temperature ranging from 4° C. to 50° C.

20 Claims, 10 Drawing Sheets

(51) Int. Cl.
| | |
|---|---|
| C02F 1/44 | (2006.01) |
| C02F 1/28 | (2006.01) |
| C02F 5/08 | (2006.01) |
| B01D 61/08 | (2006.01) |
| A23L 2/74 | (2006.01) |
| A61H 33/00 | (2006.01) |

(56) References Cited

U.S. PATENT DOCUMENTS

| | | | |
|---|---|---|---|
| 5,431,810 | A | 7/1995 | Russo et al. |
| 5,858,430 | A * | 1/1999 | Endico ............... A23L 3/3409 422/21 |
| 6,063,295 | A | 5/2000 | Williams et al. |
| 6,284,293 | B1 | 9/2001 | Crandall et al. |
| 6,386,751 | B1 | 5/2002 | Wootan et al. |
| 6,521,248 | B1 | 2/2003 | Holloway et al. |
| 7,806,584 | B2 | 10/2010 | Wootan et al. |
| 8,550,696 | B2 | 10/2013 | Ebers et al. |
| 8,771,524 | B2 | 7/2014 | Vorage et al. |
| 10,626,036 | B1 | 4/2020 | Guoin |
| 2003/0230522 | A1* | 12/2003 | Pavel ............... B01D 61/022 210/137 |
| 2007/0286795 | A1 | 12/2007 | Chiba et al. |
| 2012/0085687 | A1 | 4/2012 | Simonette |
| 2013/0041312 | A1 | 2/2013 | Eckert |
| 2014/0166498 | A1 | 6/2014 | Orolin et al. |
| 2017/0203986 | A1* | 7/2017 | Ervin ............... C02F 9/00 |

OTHER PUBLICATIONS

Bickers, D.R., et al., "Oxidative Stress in the Pathogenesis of Skin Disease," Journal of Investigative Dermatology vol. 126(12):2465-75. Jan. 2006. 11 pages.
Bunkin., N.F., et al., "Structure of the Nanobubble Clusters of Dissolved air in Liquid Media," J Biol Phys. vol. 38(1):121-52. Jan. 2012. 32 pages.
Cameron., R., "Tiny Bubbles" ACCJ Journal, pp. 35-37. Jun. 2005. 3 pages.
Chaplin., M., "Water Structure and Science: Nanobubbles (ultrafine bubbles)," accessed at http://www1.lsbu.ac.uk/water/nanobubble.html. Jan. 2007. 13 Pages.
Chougule , S.S., et al., "Comparative Study on Heat Transfer Enhancement of Low Volume Concentration of AL2O3—Water and Carbon Water Nanotube- Water Nanofluids in Laminar Regime Using Helical Screw Tape Inserts," *Exp. Heat Transfer*, vol. 28(1). pp. 17-36.Aug. 2015.21 Pages.
Connor, M.J., et al., "Depletion of Cutaneous Glutathione by Ultraviolet Radiation," *Photochemistry and Photobiology* vol. 46(2). pp. 239-45. Aug. 1987. 7 Pages.
Duntas, L.H., et al., "Selenium and Inflammation- Potential Use and Future Perspectives" US Endocrinology, 11:97- 102.Jan. 2015.6 Pages.
Harch, P.G., "Hyperbaric oxygen in chronic traumatic brain injury: oxygen, pressure, and gene therapy." Medical Gas Research vol. 5(9). Jul. 14, 2015. 4 pages
Idec, "What are Ultrafine Bubble," Jan. 2017 Website accessed at https://www.idec.com/home/finebubble/bubble01.html. 3 pages.
Kim, A.L. et al., "Role of p38 MAPK in UVB-Induced Inflammatory Responses in the Skin of SKH-1 Hairless Mice," Journal of Investigative Dermatology vol. 124(6):1318-25.Jun. 2005. 8 Pages.
Lee, Y.S., et al., "Long Course Hyperbaric Oxygen Stimulates Neurogenesis and Attenuates Inflammation after Ischemic Stroke," Mediators of Inflammation vol. 2013, Article ID 512978, 13 pages. Jan. 2013. 14 Pages.
Li, H., et al., "Antagonistic Effects of P53 and HIF1A on MicroRNA-34-a Regulation of PPP1R11 and STAT3 and Hypoxia-induced Epithelial to Mesenchymal Transition in Colorectal Cancer Cells," American Gastroenterological Association vol. 153(2): 505-20. Aug. 2017. 17 pages.

Lower, S., "H2O: A Gentle Introduction to Water and its Structure," accessed at<http://www.chem1.com/acad/sci/aboutwater.html> on Sep. 5, 2019. 15 Pages.
Ludwig-Maximilians-Universitat Munchen. "Cancer Metastasis: The unexpected perils of hypoxia." ScienceDaily,May 11, 2017, Accessed at https://www.sciencedaily.com/releases/2017/05/170511113523.htm>. 5 Pages.
Mayo Clinic. "Skin cancer on the rise." ScienceDaily, May 15, 2017. Accessed at http://www.sciencedaily.com/releases/2017/05/170515141000.htm>. 5 Pages.
McColl, A., et al., "TLR7-mediated skin inflammation remotely triggers chemokine expression and leukocyte accumulation in the brain," Journal of Neuroinflammation vol. 13 (102).May 2016. 16 Pages.
"Naneau: Breathing Life into Water,"2019 Website. Accessed at <http://www.inspiredwaters.com/ on Sep. 2019. 11 Pages.
"Naneau O2 Water," Jan. 2019 Marketing materials by Naneau. 26 Pages.
Naneau Oxygen Nanobubbles Website: Home page, About Naneau, and the Science behind Naneau. Accessed fromhttps://naneauhealth.com/> on Nov. 21, 2019. 26 Pages.
Non-Final Office Action for U.S. Appl. No. 15/727,560 filed, Oct. 6, 2017 on behalf of Perfect Water Worldwide, LLC. Mail Date: Aug. 21, 2019. 21 Pages.
Pansky, B., "Review of Medical Embryology Book, Chapter 25: Germ Layers and their Derivatives," accessed at< https://discovery.lifemapsc.com/library/review-of-medical-embryology/chapter-25-germ-layers-and-their-derivatives on Sep. 5, 2019. 2 Pages.
Reelfs, O., et al., "Ultraviolet a Radiation-Induced Immediate Iron Release Is a Key Modulator of the Activation of NF-κB in Human Skin Fibroblasts," Journal of Investigative Dermatology vol. 122(6):1440-47. Jun. 2004. 8 Pages.
Restriction Requirement for U.S. Appl. No. 15/727,560, filed Oct. 6, 2017, on behalf of Perfect Water Worldwide LLC. Mail Date: Jan. 2, 2019. 9 pages.
Scheuplein, R.J., "Mechanism of Percutaneous Absorption: II. Transient Diffusion and the Relative Importance of Various Routes of Skin Penetration," Journal of Investigative Dermatology vol. 48(1): 79-88.Jan. 1967. 10 pages.
"State of the Air 2016," Report by the American Lung Association, accessed at<http://www.lung.org/assets/documents/healthy-air/state-of-the-air/sota-2016-full.pdf in Jan. 2016. 157 Pages.
XI., C., et al., "Reduction of Ammonia Emission in Chicken Farms by Improved Water Systems," Jan. 2011. Accessed from <http://www.inspiredwaters.com/naneau-science-studies/ on Sep. 2019. 2 Pages.
Yurchenko., S.O., et al., "Ion-Specific and Thermal Effects in the Stabilization of the Gas Nanobubble Phase in Bulk Aqueous Electrolyte Solutions," Langmuir 32 (43):11245-11255. Jun. 2016. 12 Pages.
Zhang, Q., et al., "Hyperbaric Oxygen Attenuates Apoptosis and Decreases Inflammation in an Ischemic Wound Model," J Invest Dermatol, 128(8):2102-12. Mar. 2008. 11 Pages.
Zhao, B., et al., "Hyperbaric oxygen attenuates neuropathic pain and reverses inflammatory signaling likely via the Kindlin-1/Wnt-10a signaling pathway in the chronic pain injury model in rats," J Headache Pain, 18(1). Jan. 5, 2017. 8 Pages.
Battino, R., T.R. Rettich, and T. Tominaga, "The solubility of oxygen and ozone in liquids". Journal of physical and chemical reference data, 1983. 12(2): pp. 163-178.
Biocera Catalogue, published by Dr. Jeon Hyoung-Tag, Biocera Co. Ltd., South Korea, accessed on May 13, 2017 at www.biocera.co.kr. 30 pages.
Das, C. and P.D. Olmsted, "The physics of stratum corneum lipid membranes", Philosophical Transactions of the Royal Society, Apr. 2016. 374(2072): pp. 1-17.
Dr. Jeffrey McCombs, "The Physiology of Oxygenated Water". May 2017. 4 pages.
"Dr. Otto Heinrich Warburg Nobel Prize Winner *The Root Cause of Cancer*". 1 page.
Ebina, et al. "Oxygen and Air Nanobubble Water Solution Promote the Growth of Plants, Fishes, and Mice" Osaka University, PLOSs One, vol. 8, Issue 6, Jun. 2013. 7 pages.

(56) References Cited

OTHER PUBLICATIONS

Eucerin, "Understanding skin", accessed on Jun. 5, 2017 at <http://www.eucerin.sg/about-skin/basic-skin-knowledge/skin-structure-and-function.> 15 pages.
"Hyperbaric oxygen therapy", Mayo Clinic, accessed on May 24, 2017 at <http://www.mayoclinic.org/tests-procedures/hyperbaric-oxygen-therapy/basics/definition/prc-20019167>. Nov. 2014: 3 pages.
Ignatov, I. and O. Mosin, "Structural Mathematical Models Describing Water Clusters". Published by The International Institute for Science, Technology and Education, vol. 3, No. 11, 2013. pp. 72-88.
*Kaqun Hungary Oxygenated Water Research Studies*. "Report about effects of Kaqun water on the speed of cognitive functions"; Kocsis, et al. "Study on the effect of Kaqun water on antioxidant capacity"; Biro, et al. "The effect of Kaqun-water on the immune parameters of healthy volunteers", National Institute of Chemical Safety, Dec. 2009. www.kaqun.sk/en/studies. 5 pages.
Kasai, Y., et al., "The $H_2O$—$O_2$ water vapour complex in the Earth's atmosphere". Atmospheric Chemistry and Physics, Aug. 2011. 11(16): pp. 8607-8612.
Ladizinsky, D. and D. Roe, "New Insights Into Oxygen Therapy for Wound Healing. Wounds", 2010. 22(12): p. 294-300.
Lambrechts et al. "Normalizing tumor oxygen supply could be key factor in the fight against cancer", Nature, Aug. 2016. 1 page.
Madagascar Minerals "Rose Quartz Spheres" website, accessed Oct. 16, 2017. Tucson, AZ. 2003-2017.<www.madagascarminerals.com/cat_rose_quartz_spheres1.cfm>.
Potts, R.O. and M.L. Francoeur, "Lipid biophysics of water loss through the skin." Proceedings of the National Academy of Sciences, May 1990. 87(10): p. 3871-3873.
Shimadzu, Application News, Nano Particle Size Analyzer: SALD-7101, No. 4, Downloaded from <http://www.ssi.shimadzu.com/products/literature/testing/microbubbles°/020nanobubbles%20red.pdf> accessed on Jul. 24, 2017. pp. 1-3.
Spivey, N., "Application Note, Atomic Absorption, Analysis of Major Elements in Drinking Water Using Fast Flame Sample Automation for Increased Sample Throughput". 2015: pp. 1-5.
Stillinger, F.H., "Theory and molecular models for water". Adv. Chem. Phys, 1975. 31(1). 101 pages.
Stücker, M., et al., "The cutaneous uptake of atmospheric oxygen contributes significantly to the oxygen supply of human dermis and epidermis." The Journal of physiology, 2002. 538(3): pp. 985-994.
"Thermo Scientific Orion Chlorine XP Water Quality Analyzer UM-269688-001 Revision C." Nov. 2016: pp. 1-57.
Uchida, T., et al., "Effect of NaCI on the Lifetime of Micro-and Nanobubbles". Nanomaterials, Feb. 2016. 6(2): 10 pages.
United States Environmental Protection Agency, Method 8265, Volatile Organic Compounds in Water, Soil, Soil Gas, and Air by Direct Sampling Ion Trap Mass Spectrometry (DSITMS). Mar. 2002: pp. 1-64.
Van Smeden, J. and J.A. Bouwstra, "Stratum corneum lipids: their role for the skin barrier function in healthy subjects and atopic dermatitis patients", in Skin Barrier Function. Feb. 2016, Karger Publishers. 2 pages (abstract only).
Wikipedia, "Air pollution", accessed on May 26, 2017 at <https://en.wikipedia.org/wiki/Air_pollution>. 2017: p. 1-26.
Wikipedia, Metastability, accessed on Jun. 5, 2017 at <https://en.wikipedia.org/wiki/Metastability>. 2017. p. 1-5.
Yeomans, et al. "Oxygen absorption by skin exposed to oxygen supersaturated water." Can J Physiol. Pharmacol. May 2012. 1 page. (abstract only).
Yeomans, et al. "Skin oxygen tension is improved by immersion in oxygen-enriched water."Int. J. Cosmet. Sci. Dec. 2013. 1 page. (abstract only).
Yin, H., et al., "Metastable water clusters in the nonpolar cavities of the thermostable protein tetrabrachion". Journal of the American Chemical Society, 2007. 129(23): p. 7369-7377.
Briganti, S., et al., "Antioxidant Activity, Lipid Peroxidation and Skin Diseases. What's New," The Journal of the European Academy of Dermatology and Venereology, 17 (6).Oct. 2003. 1 Page. Abstract Only.
Dhar, A., et al., "The role of AP-1, NF-κB and ROS/NOS in skin carcinogenesis: The JB6 model is predictive," Mol and Cellular Biochem vol. 234(1):185-93. May 2002. 1 Page. Abstract Only.
Ernstene, C., et al., "Cutaneous Respiration in Man," J Clin Invest. May 1,1932; 11(2):387-390. 5 Pages.
Fitzgerald, L.R., et al., "Cutaneous respiration in man," Physiological Reviews vol. 37(3):325-345. Jul. 1, 1957.3 Pages. First Page Only.
Gruber, R.P., et al., "Skin Permeability to Oxygen and Hyperbaric Oxygen," Arch Surg. 101(1):69-70. Jul 1970.1 Page. Abstract Only.
Kaqun: The Element Kaqun Studies 2004-2013, 2nd Edition. Budapest, 2013. 183 Pages.
Kotecha, R., et al, "Oxygen treatment attenuates systemic inflammation via cholinergic pathways," Journal of surgical Research vol. 181(1):71-73. Mar. 28, 2012.1 Page. Abstract Only.
Non-Final Office Action for U.S. Appl. No. 15/727,217 filed, Oct. 6, 2017 on behalf of Perfect Water Worldwide, LLC Mail Date: Jun. 17, 2020. 17 Pages.
Notice of Allowance for U.S. Appl. No. 15/727,560 filed, Oct. 6, 2017 on behalf of Perfect Water Worldwide, LLC. Mail Date: Feb. 13, 2020. 13 pages.
Scheuplein, R.J., et al., "Permeability of the Skin," Psychological Reviews vol. 51(4): 702-47. Oct. 1971. 1Page. Introduction Only.

* cited by examiner

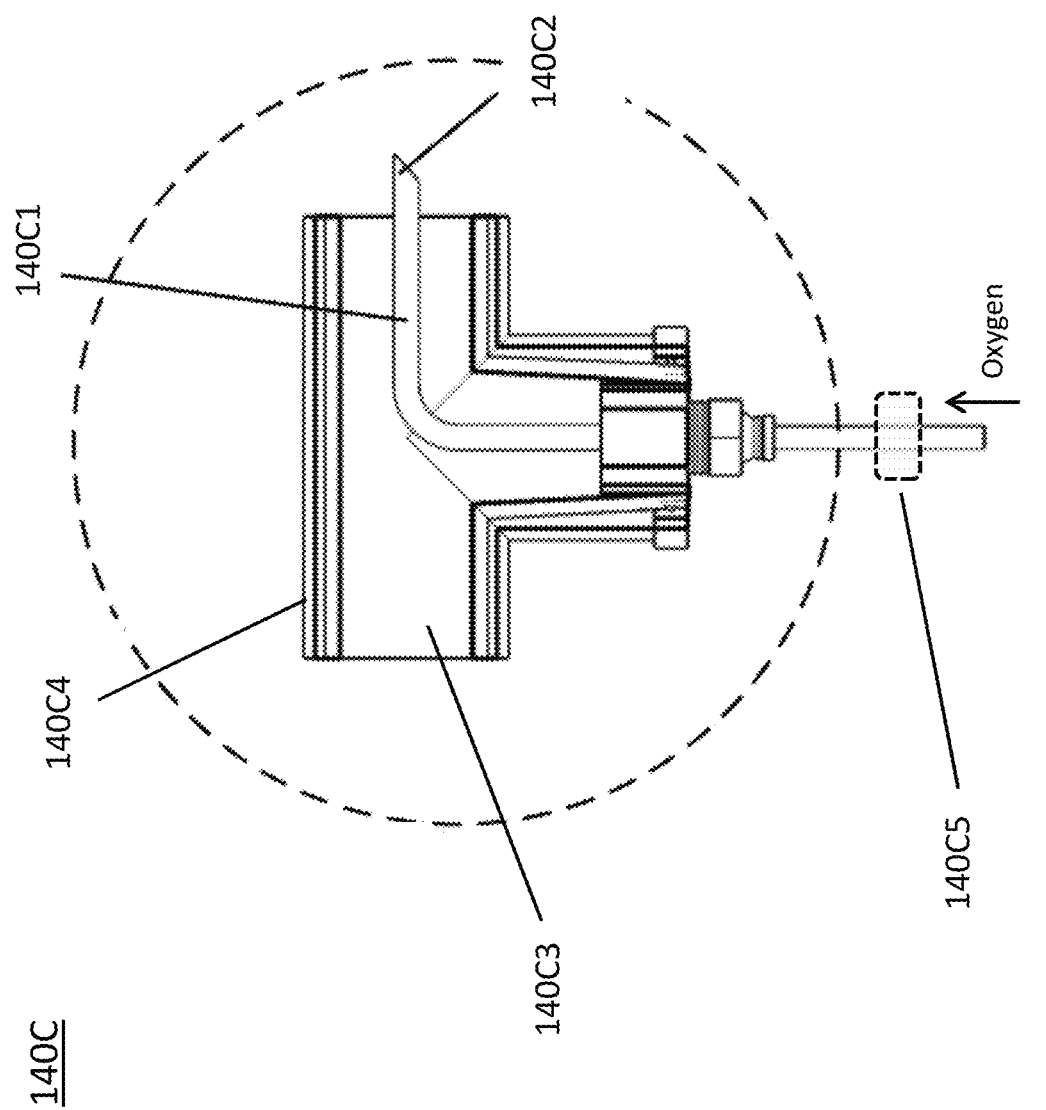

HYPER-OXYGENATED SOAKING SPA SYSTEM

CROSS REFERENCE TO RELATED APPLICATIONS

The present application may be related to U.S. application Ser. No. 15/727,217 entitled "SELF-CONTAINED WATER SYSTEM" filed on Oct. 6, 2017, U.S. provisional Application No. 62/569,432 entitled "VORTEXING CHAMBER AND SYSTEM" filed on Oct. 6, 2017, and U.S. application Ser. No. 15/727,560 entitled "HYPER-OXYGENATED WATER COMPOSITIONS AND RELATED METHODS AND SYSTEMS" filed on Oct. 6, 2017, each of which is incorporated herein by reference in its entirety.

TECHNICAL FIELD

The present disclosure relates to systems and methods for control of water quality for soaking of human body, including purification, oxygenation and restructuring of water via a centralized and self-contained system.

BACKGROUND

Living water had been a source of natural healing on Earth for eons. With the Industrial Revolution, much of the world's fresh water became polluted and denatured. There used to be more oxygen in both earth's atmosphere and water. Today tap water contains between 2-4 parts per million (ppm) of oxygen. Atmospheric oxygen levels have dropped from 26% to 21%. Not surprisingly, oxygen is a highly prescribed "drug" in hospitals. Recent studies show the extraordinary benefits of increasing the body's oxygen levels. Since hyperbaric oxygen chambers were discovered for treating cancer and other serious diseases we have been looking for the most effective ways to saturate the cells and tissues with oxygen.

90% of the body's available energy comes from oxygen, and stabilized oxygen in water is readily bio-available. We commonly associate oxygen intake with breathing air through the lungs but scientific studies have shown that soaking in water is an effective therapy for oxygen absorption. The skin, our largest organ, can absorb oxygen directly into the cells more efficiently than with hyperbaric oxygen or other bio-oxidative therapies. The health benefits of saturating our cells and tissues with high levels of oxygen prove that increased oxygen levels enable a human body (e.g., animal) to detoxify more efficiently. Some of such benefits may include: reduced signs of aging; increased metabolism and detoxification; increased immune function; improvement of chronic skin conditions; and reduced recovery time from injuries. Also, some studies have shown that oxygen deficiency may be a root cause of cancer and that cancer cells may not survive in the presence of high levels of oxygen.

With the increase in toxins found in our environment, diseases such as cancer, autoimmune disorders, skin conditions, and more, are rising at an alarming rate. As shown in many studies, many of these diseases may not exist in the presence of high levels of oxygen. Also, with the benefit of superior hydration, more efficient detoxification and increased energy, the therapeutic potential of a hyper-oxygenated soaking spa becomes clear.

SUMMARY

Teachings according to the present disclosure include a low maintenance water system that is configured to purify and remineralize incoming water to fill a soaking vessel, and sanitize and oxygenize the soaking vessel water to deliver and maintain a water quality that is purified, alkaline, ionized, mineral-rich, and oxygen-rich water. Such water system may be configured as a centralized and self-contained system adaptable to any conventional soaking spa.

According to a first embodiment of the present disclosure, a self-contained water system is presented, the self-contained water system comprising: a water inlet; a water outlet; a water nano-purification pre-treatment stage configured to receive water from the water inlet and generate pre-treated water having a total dissolved solids (TDS) of about 4 parts per million (ppm); a water remineralization stage configured to receive the pretreated water and generate therefrom mineralized water having mineral content according to a desired level that is provided to a soaking vessel; a water sanitizer stage configured to receive water from the soaking vessel and provide sanitized water that is free of living contaminants and bacteria (microorganisms) to the soaking vessel; and a water oxygenation stage configured to receive water from the soaking vessel and provide oxygenated water to the soaking vessel, the water oxygenation stage further configured to control a dissolved oxygen concentration of the water provided to the soaking vessel from a low value equal to 10 mg per liter, to a high value equal to 50 mg per liter, and to any value between the low value and the high value.

According to a second embodiment of the present disclosure, a method for water treatment is presented, the method comprising: a) upon detection of a pressure demand from a soaking vessel: a1) feeding water from an inlet to a water nano-purification pre-treatment stage configured to receive water from the water inlet and provide pre-treated water having a total dissolved solids (TDS) of about 4 parts per million (ppm); a2) feeding the pre-treated water to the soaking vessel through a water remineralization stage that is configured to provide to the water a mineral content according to a desired level; b) circulating the pre-treated and remineralized water from the soaking vessel through a water sanitizer stage configured to receive water from the soaking vessel and provide sanitized water that is free of living contaminants and bacteria (microorganisms) to the soaking vessel; and c) circulating the pre-treated, remineralized, and sanitized water from the soaking vessel through a water oxygenation stage configured to receive water from the soaking vessel and provide oxygenated water to the soaking vessel, the water oxygenation stage further configured to control a dissolved oxygen concentration of the water provided to the soaking vessel from a low value equal to 10 ppm, to a high value equal to 50 ppm, and to any value between the low value and the high value.

Further aspects of the disclosure are shown in the specification, drawings and claims of the present application.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 5B illustrates details of an oxygen injector, according to an embodiment of the present disclosure, used in the oxygenation loop depicted in FIG. 5A.

DETAILED DESCRIPTION

One of the main obstacles in providing a hyper-oxygenetad soaking spa has been an apparent incapability to consistently produce stabilized oxygen in water above 14 parts per million (ppm). It is believed that higher levels of oxygen in water can provide added therapeutic benefits as discussed above. The water system according to the present disclosure can consistently produce water with stabilized oxygen levels of 20 ppm and above (e.g., up to 50 ppm). Such water system may be added to any conventional soaking spa, which may include a soaking vessel, a water pump and a filter, and operate as a parallel water system to the conventional soaking spa.

Addition of the water system according to the present disclosure to a conventional soaking spa may in turn allow conversion of the conventional soaking spa to an effective hyper-oxygenated soaking spa with water that is consistently purified, alkaline, ionized, mineral-rich, and oxygen-rich. Along with high stabilized oxygen levels, the water is nano-purified to provide a 100% chlorine-free soaking experience. No chemicals are necessary to provide such water quality. The combination of stabilized oxygen, hi-output ozone ($O_3$), UV sterilization, and $H_2O_2$ provided in the water generated by the water system according to the present disclosure, allows for an ultra-clean and naturally sanitized soaking spa.

As used herein, the expression "hyper-oxygenated water" refers to a water which contains molecular oxygen $O_2$ in a total amount of at least 10 ppm up at a temperature ranging from 4° C. to 50° C.

As used herein, the expression "dissolved oxygen" refers to oxygen that is homogeneously mixed with water in a thermodynamically stable state to form a single phase of matter. In this context, as used in the present disclosure, the dissolved oxygen is also said to be stabilized, or stable, oxygen in the water.

As used herein, the term "nanobubble" refers to a substantially spherical body of gas having a diameter of 100 nm or less, wherein the substantially spherical body is suspended in liquid water.

Figure 1:
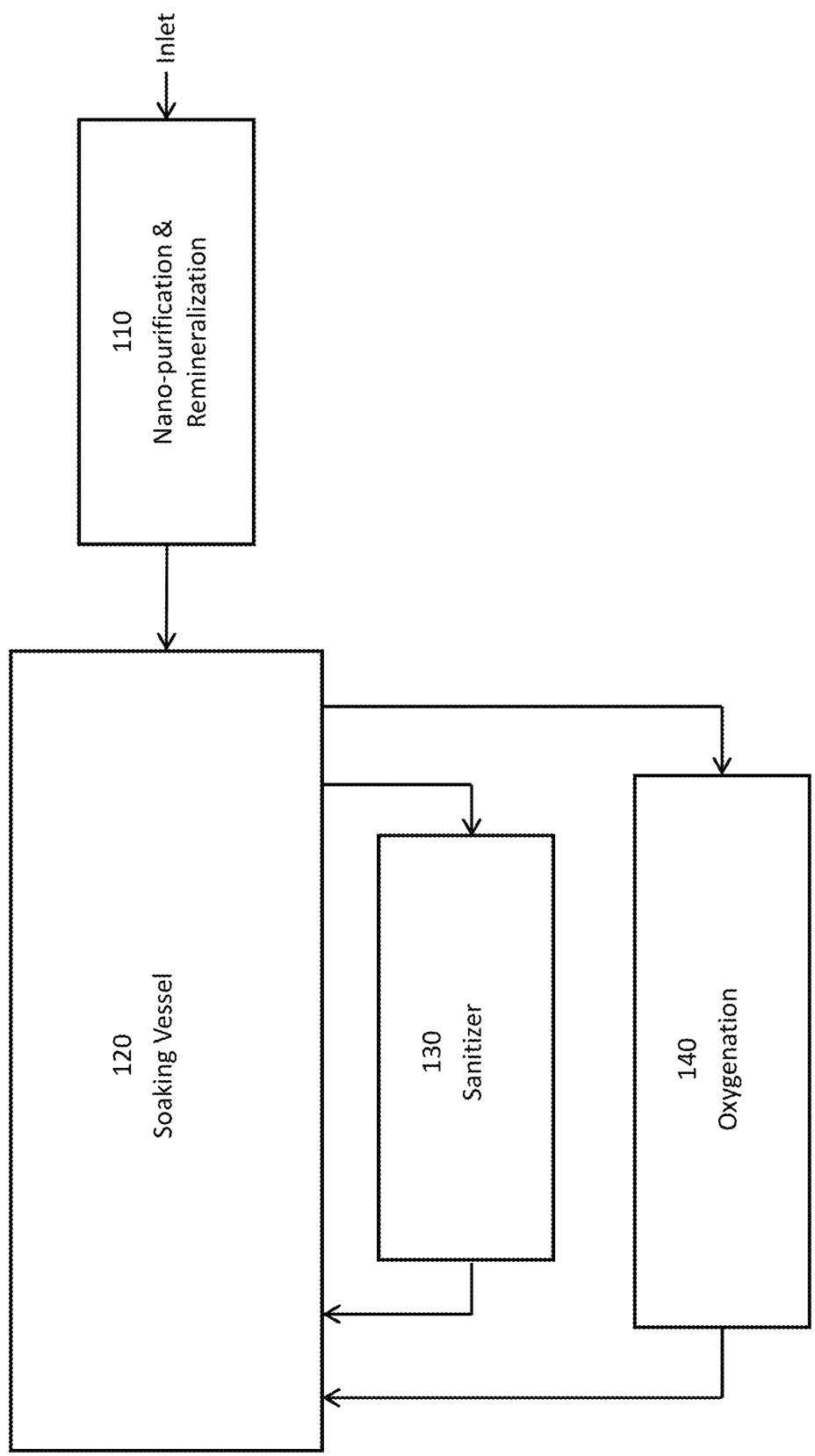
FIG. 1 illustrates a functional block diagram of the water system according to the present disclosure, comprising a nano-purification and remineralization stage, a sanitizer loop, and an oxygenation loop, for delivery and maintenance of purified, alkaline, ionized, mineral-rich, and oxygen-rich water of a soaking vessel.

FIG. 1 illustrates a functional block diagram (100) of the water system according to the present disclosure which is configured to purify and remineralize incoming water through an inlet to fill a soaking vessel (120), and sanitize and oxygenize the soaking vessel (120) water to deliver and maintain a water quality that is purified, alkaline, ionized, mineral-rich, and oxygen-rich water.

According to an embodiment of the present disclosure, the soaking vessel (120) depicted in FIG. 1 may be made of any material and be of any fluidic capacity. In some exemplary embodiments such soaking vessel (120) may have a capacity of approximately 750 fluid gallons (approximately 2850 liters), or more, and made of a material that includes stainless steel or wood. Such soaking vessel may be part of a conventional soaking spa that may include the soaking vessel (120), a water pump and a filter (not shown). The water system (100) according to the present teachings may be installed on such conventional soaking spa, and operate as a parallel water system to the conventional soaking spa.

With continued reference to the functional block diagram of the water system (100) of FIG. 1, water fed through the inlet is routed to a nano-purification and remineralization stage (110), with further details shown in FIG. 2 later described, which, in a first stage, is configured to soften, pre-filter, and nano-purify the incoming water to reduce total dissolved solids (TDS) in the water to about 4 parts per million (ppm) or less, and in a second stage, remineralize the nano-purified water to include a desired amount of minerals at a desired level of alkalinity (pH) before feeding the water to the soaking vessel (120).

The nano-purified and remineralized water in the soaking vessel (120) may in turn be processed according to functionalities provided by two separate water treatment loops; the sanitizer loop (130) and the oxygenation loop (140). The sanitizer loop (130) may sanitize the water by disinfecting the water and removing contaminants and other impurities that could not be removed by the nano-purification and remineralization stage (110). These include any living contaminants and bacteria (microorganisms). Functionality of the sanitizer loop (130) may be provided according to a series of stages (e.g., FIGS. 3-4 later described) that may include ultraviolet (UV) sterilization, ozonation to ionize the water, as well as hydrogen peroxide ($H_2O_2$) treatment to further disinfect the water. Accordingly, the water in the soaking vessel (120), as processed by the nano-purification and remineralization stage (110) and the sanitizer loop (130), is a filtered, nano-purified, mineral-rich, pH balanced, and contaminant free water that is devoid of organic and inorganic contaminants.

Independent from the sanitizer loop (130), the oxygenation loop (140) is used to enrich oxygen content of the water in the soaking vessel (120) by mixing appropriate amount of oxygen with water through a high velocity hydraulic system that generates nanobubbles of oxygen that dissolve in the water. Total dissolved oxygen concentration of the water may be monitored and accordingly kept to a desired concentration (e.g., 10-50 ppm) by controlling ON/OFF cycles of the oxygenation loop (140) in a closed loop fashion. Alternatively, an ON/OFF duty cycle of the oxygenation loop (140) may be pre-programmed based on known/expected total dissolved oxygen concentration in the soaking vessel (120). In other words, the oxygenation loop (140) is configured to produce and deliver hyper-oxygenated water in the soaking vessel (120). It should be noted that the pretreatment of the water in the soaking vessel (120) via the nano-purification and remineralization stage (110) and the sanitizer loop (130) according to the present disclosure promotes generation of high levels of dissolved oxygen concentration in the range of 10-50 ppm. Applicant of the present disclosure has found that removal of organic and inorganic impurities from the water may create voids at the molecular level in the water which may be filled with oxygen molecules to provide an increase in the dissolved oxygen concentration of the water.

With further reference to FIG. 1, the soaking vessel (120) of the water system (100) according to the present teachings is therefore configured to contain water that is free of any organic and inorganic contaminants. Furthermore, total dissolved concentration of oxygen in the water of the soaking vessel (120) can be controlled by the oxygenation loop (140) to levels in a range of about 10 mg/L to about 50 mg/L.

Recirculation of water from the soaking vessel (120) through the sanitizer loop (130) and the oxygenation loop (140), as well as delivery of water from the inlet to the soaking vessel (120) via the nano-purification and remineralization stage (110) may be provided by dedicated delivery/recirculation pumps.

Figure 6A:
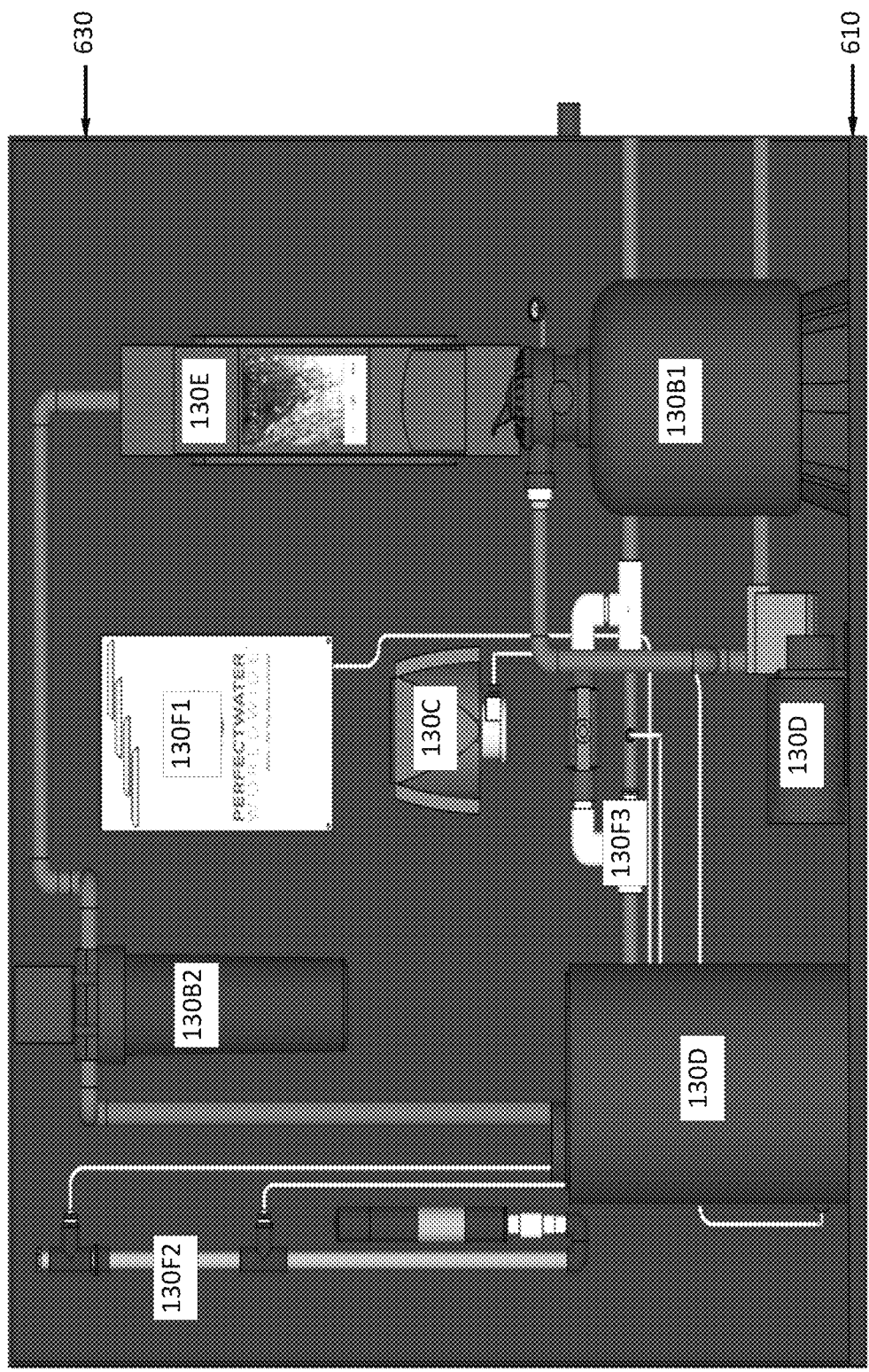
FIG. 6A and FIG. 6B respectively illustrate a front view and a rear view of an exemplary implementation according to the present disclosure of the water system depicted in FIG. 1.
Figure 6B:
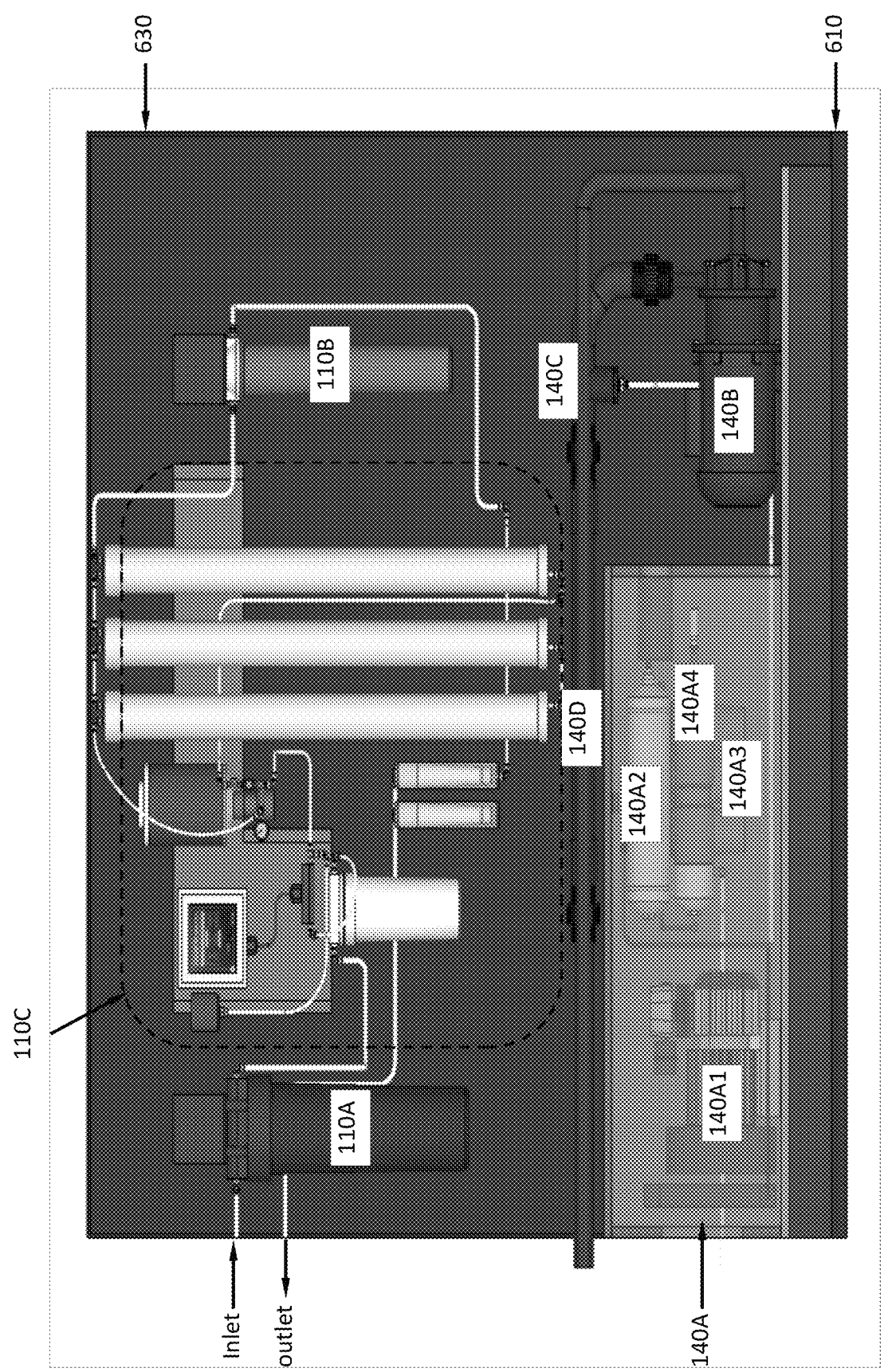

The various functional blocks discussed above with reference to the block diagram of FIG. 1 may be implemented as a self-contained assembly (e.g., FIGS. 6A-6B later described). A person skilled in the art would appreciate advantages associated with such self-contained assembly configuration, including advantages associated to manufacturing, testing, troubleshooting, transportation, installation, reduced footprint, and maintenance. As can be seen in FIGS. 6A-6B later described, the entire self-contained assembly may be placed on a base plate (610) with a frame structure (630) that may be used to fixate and mount the functional blocks (110, 130, 140). Added structural rigidity to the self-contained assembly can be therefore provided by the base plate (610) and the frame structure (630). Further implementation details of the water system (100) according to the present teachings depicted in FIG. 1 are described in the following paragraphs.

Figure 2:
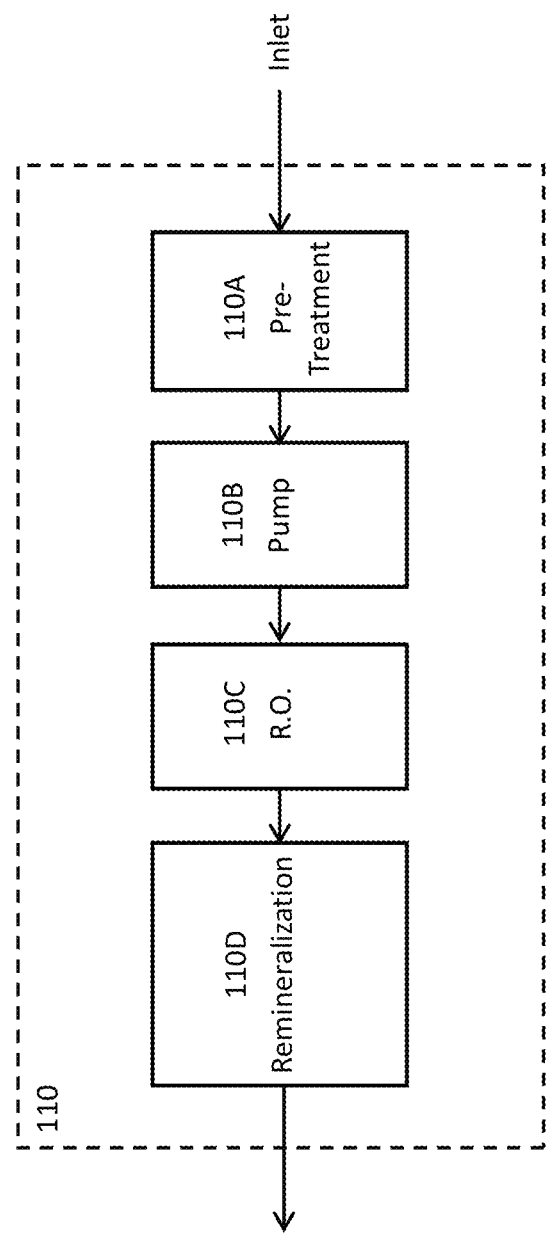
FIG. 2 illustrates details of the nano-purification and remineralization stage of the water system according to the present disclosure depicted in FIG. 1.

FIG. 2 shows details of the nano-purification and remineralization functional stage (110). According to an embodiment of the present disclosure, the nano-purification and remineralization functional stage (110) comprises a water softening pretreatment stage (110A), a reverse osmosis R.O. stage (110C), a feeding pump of the reverse osmosis stage (110B), and a remineralization stage (110D).

The water softening pretreatment stage (110A) may comprise a multi-media tank with a single control head for pretreatment softening of water from the inlet. The pretreatment of water may remove larger particles and solids from the incoming water, as well as chlorine, to protect subsequent functional blocks, such as, for example, a membrane of the reverse osmosis R.O. stage (110C).

A large capacity of the multi-media tank of the water softening pretreatment stage (110A) and a large capacity of the R.O. stage (110C) may allow for constant and expeditious softening of water from the inlet to the soaking vessel (110) according to a desired water flow rate set by a feed pump (110B) of the reverse osmosis R.O. stage (110C). As can be seen in FIG. 2 the feed pump (110B) pulls water from the inlet, through the water softening pretreatment stage (110A) and pushes the water to the R.O. stage (110C) and to a remineralization stage (110D) before being fed to the soaking vessel (120).

With continued reference to FIG. 2, the multi-media tank of the water softening pretreatment stage (110A) may include a water softening pretreatment filtration media configured to remove larger particles and solids from the water. Further included in the multi-media tank of the pretreatment stage (110A) may be a sediment filtration media, e.g., a sediment filter by manufacturer Enpress LLC (Eastlake, Ohio., USA), configured to collect and trap sediment and other particles such as, for example, dirt, silt, and rust that may pass through the water softening pretreatment filtration media. Also included in the multi-media tank of the pretreatment stage (110A) may be a carbon filtration media configured to remove any chlorine from the water in order to protect the membrane from chlorine induced damage. According to one exemplary embodiment of the present disclosure, the carbon filtration media may include one or more of (organic) coconut (shell) carbon, KDF (kinetic degradation fluxion) carbon, catalytic carbon or other suitable media for protecting the R.O. system.

With further reference to FIG. 2, carbon filtered, chlorine-free, softened water, through the water softening pretreatment stage (110A) is fed to an R.O. membrane and housing of the reverse osmosis filtration stage (110C) by way of the pump (110B). According to one exemplary embodiment of the present disclosure, the pump (110B) may be a three-phase high pressure pump to provide high enough water pressure and flow to push water through the R.O. membrane and housing of the reverse osmosis filtration stage (110C), thereby nano-purifying and reducing total dissolved solids (TDS) in the water provided to the remineralization stage (110D). According to a preferred embodiment of the present disclosure, the reverse osmosis filtration stage (110C) can reduce the total dissolved solids in the water provided to the remineralization stage (110D) to 4 parts per million (ppm) or better. It should be noted that such nano-purification of the water provided by the functional stages (110A, 110C) may create voids at the molecular level in the water that promote high levels of dissolved oxygen in the water. According to an embodiment of the present disclosure, wasted water from the reverse osmosis R.O. stage (110C) is recycled through the R.O. stage to reduce effective wasted (drained) water to about 20% of the water from the water softening pretreatment stage (110A).

According to a preferred embodiment of the present disclosure, the pump (110B) of FIG. 2 is configured to fill the soaking vessel (120) in a time less than one hour for a soaking vessel (120) capacity of 750 gallons (approximately 2,850 liters) According to a preferred embodiment of the present disclosure, the pump (110B) can provide a continuous flow of nano-purified water to the soaking vessel (120) at a rate of 33 gallons per minute (e.g., approximately 125 liters per minute).

With continued reference to FIG. 2, according to an embodiment of the present disclosure, the remineralization stage (110D) may comprise a remineralizing alkaline media tank configured to add desired minerals to the incoming softened (nano-purified) water from the R.O. stage (110C) and further adjust alkalinity (i.e., pH) level of the water delivered to the soaking vessel (120) to a level according to end user needs.

With further reference to FIG. 2, activation and deactivation of the pump (110B) may be according to a manual control, or preferably, according to a detected water level of the soaking vessel (120). According to an embodiment of the present disclosure, one or more sensors (e.g., optical sensors) may be used to detect a level of the water in the soaking vessel (120), and accordingly control activation/deactivation of the pump (110B) to maintain water volume inside the soaking vessel (120) at a desired level. Set points for the desired water volume may be set according to a low-fill set point and a high-fill set point that respectively dictate activation and deactivation of the pump (110B). According to an embodiment of the present disclosure, the low-fill set point may represent 85% water volume with respect to the capacity of the soaking vessel (120), and the high-fill set point may represent about 95% water volume with respect to the capacity of the soaking vessel (120).

Figure 3:
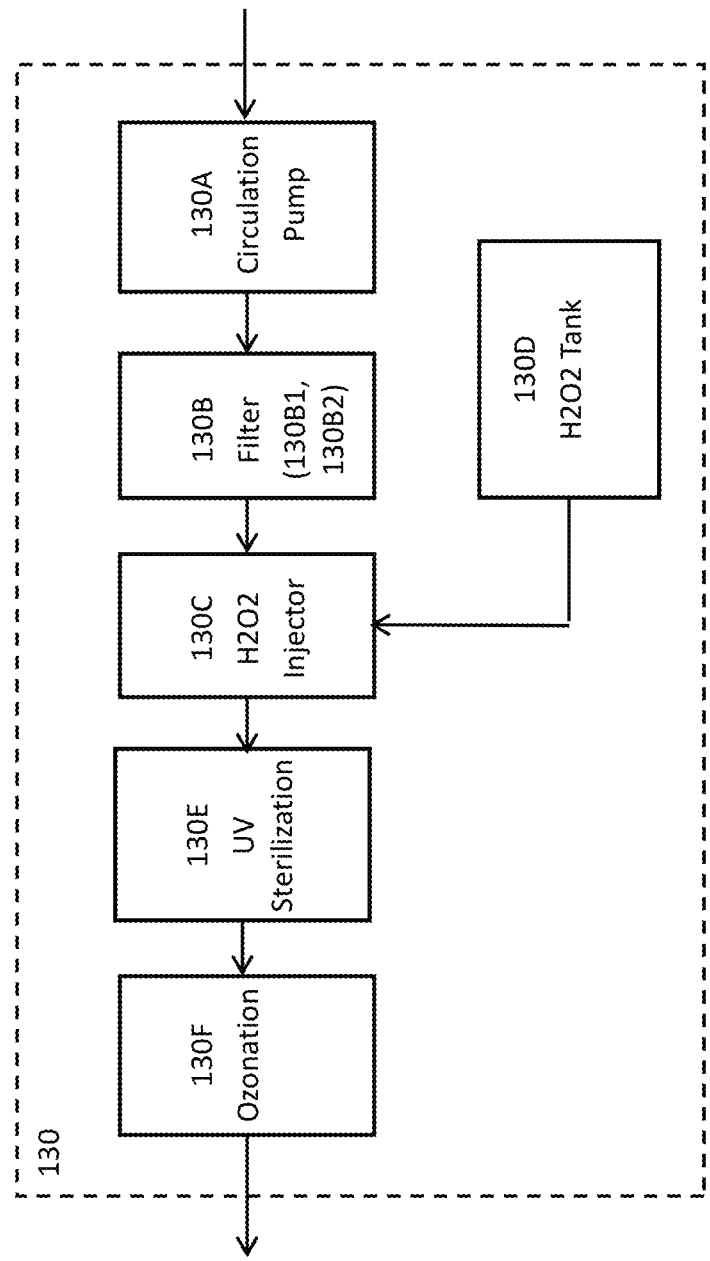
FIG. 3 illustrates details, according to the present disclosure, of the sanitizer loop of the water system depicted in FIG. 1. As can be seen in FIG. 3, the sanitizer loop comprises a hydrogen peroxide ($H_2O_2$) activator stage, an ultra-violet (UV) sterilization stage, a filter stage, an ozonation stage, a $H_2O_2$ tank, and a $H_2O_2$ injector stage.

FIG. 3 illustrates details, according to the present disclosure, of the sanitizer loop (130) of the water system depicted in FIG. 1. As noted above, a circulation pump (130D1) pushes water from the soaking vessel (120) into the various stages of the sanitizer loop (130), comprising, a filtration stage (130B), a $H_2O_2$ injector stage (130C) that injects hydrogen peroxide ($H_2O_2$) aqueous solution from a $H_2O_2$ tank (130D) into the water, an ultra violet UV treatment (sterilization) stage (130E), and an ozonation stage (130F) that inject ozone gas ($O_3$) into the water prior to routing the water back to the soaking vessel (120). Accordingly, the water circulates from the soaking vessel (120) through the sanitizer loop (130) to effectively disinfect the water and remove contaminants and other impurities that could not be removed by the nano-purification and remineralization stage (110), including any living contaminants and bacteria (microorganisms).

With further reference to FIG. 3, according to a preferred embodiment of the present disclosure, recirculation of the water through the sanitizer loop (130) provided via the circulation pump (130A), and therefore treatment of the water in the soaking vessel (120) though the sanitizer loop (130), may be continuous in time (e.g., loop that runs 24 hours), and according to a water flow controlled by a substantially constant (desired/configured) speed of the circulation pump (130A). According to one exemplary embodiment of the present disclosure, the constant speed of the circulation pump (130A) may be in a range of [2500-3450 rpm] to provide a medium flow of water of about 75 L/s (liters per second). Such flow of water may be sufficient to treat a full volume of water in the soaking vessel (120) having a capacity of about 750 gallons (approximately 2850 liters) in about 40 minutes.

With continued reference to FIG. 3, water flow through the sanitizer loop (130), pushed by the circulation pump (130A), first passes through a filtration stage (130B) that may include, in sequence, i) a first tank filled with a catalytic oxide media (130B1 of FIG. 6A later described) that promotes activation of the $H_2O_2$ in the water. Additionally, the catalytic oxide media may serve as filtration to remove suspended solids up to a size of about 3 micro-meters, as well as color, odor, iron, manganese, heavy metals and radio nuclides that may be present in the water from the soaking vessel (120), and ii) a carbon media sediment filter (130B2 of FIG. 6A later described), configured to remove any sediment in the water that may not have been removed by the catalytic oxide media.

After passing through the filtration stage (130B), the water through the sanitizer loop (130) is injected with an aqueous solution of hydrogen peroxide ($H_2O_2$) contained in a $H_2O_2$ tank (130D) via a $H_2O_2$ injector stage (130C). According to an exemplary embodiment of the present disclosure, the $H_2O_2$ injector stage (130C) may comprise an injection pump that injects $H_2O_2$ into the water stream. According to a further exemplary embodiment of the present disclosure, the injection pump may operate according to a timed schedule (e.g., ON/OFF cycle) to maintain a desired concentration of $H_2O_2$ in the water. Such desired concentration may be based on past known time schedules for which effective $H_2O_2$ concentrations were measured.

Further sanitization of the water through the sanitizer loop (130) is provided by the ultra violet UV treatment (sterilization) stage (130E) depicted in FIG. 3. As the water passes through the UV treatment stage (130E), living contaminants/bacteria in the water, such as, for example, *Cryptosporidium, E. Coli*, Fecal Coliform, and Giardia, are killed. The UV treatment stage (130E) is also effective in killing other microorganisms such as, for example, typhoid, gastroenteritis, hepatitis, flu and cholera. Finally, the UV treatment stage (130E) may organically increase oxidation potential of ozone in the water as provided through a later ozonation stage (130F).

According to a preferred embodiment of the present disclosure, the UV treatment stage (130E) may comprise two ultraviolet treatment quartz vessels operating in parallel for a higher water treatment throughput.

With continued reference to FIG. 3, $H_2O_2$ activated, UV sterilized, and filtered water through the sanitizer loop (130) is fed to an ozonation stage (130F) to ionize the water. A person skilled in the art is well aware of the beneficial effects of ozonation of water, including natural disinfection and oxidation of the water via infused ozone in the water that may react with and eliminate, for example, bacteria, viruses, protozoans and other microorganisms. Furthermore, effectiveness of ozone ($O_3$) over a wide range of pH of the water is advantageously used in the present embodiment. Further details of the ozonation stage (130F) are depicted in FIG. 4 later described.

Figure 4:
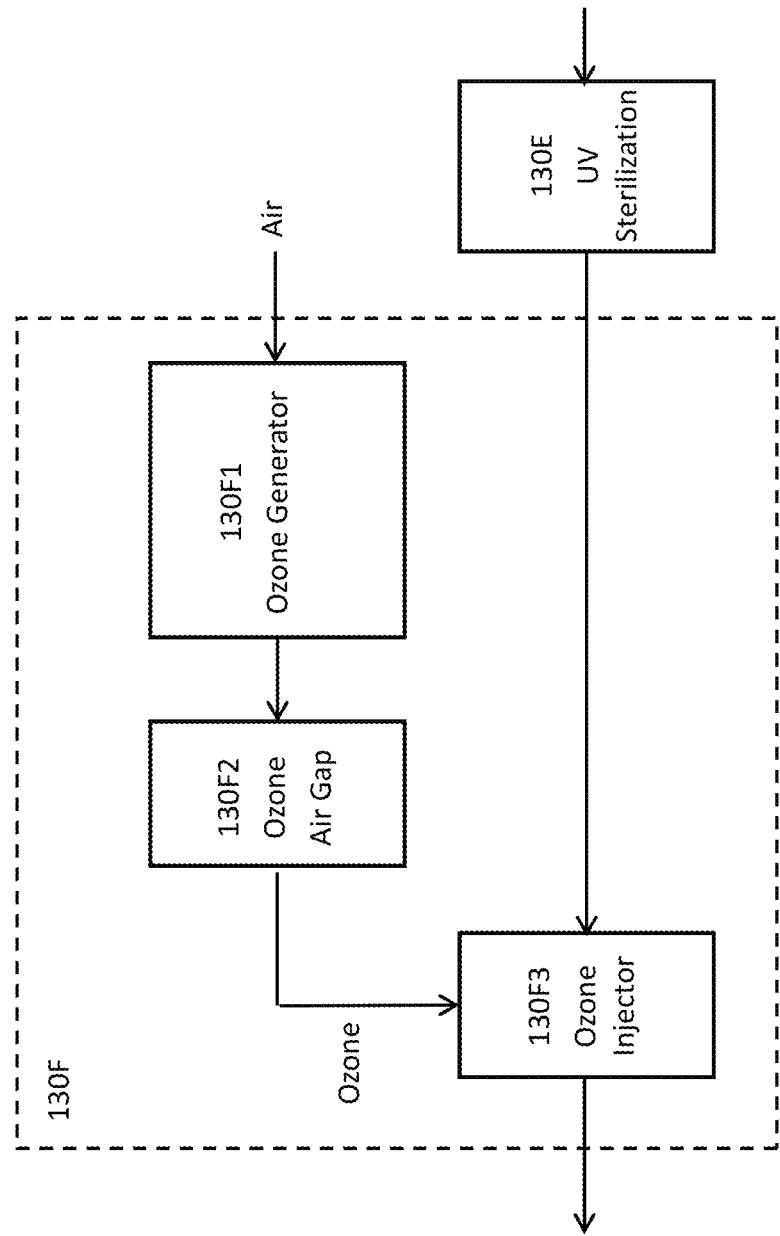
FIG. 4 illustrates details, according to the present disclosure, of the ozonation stage depicted in FIG. 3.

FIG. 4 illustrates details, according to the present disclosure, of the ozonation stage (130F) of FIG. 3. As can be seen in FIG. 4, air is provided to an ozone generator (130F1) that is configured to generate ozone gas ($O_3$) from the input air. The generated ozone than passes through an ozone air gap stage (130F2) that is configured to remove and separate moisture from the generated ozone gas thereby generating moisture free, dry, ozone for injection into the water. At the same time, water from the UV sterilization stage (130E) is pumped into the ozonation stage, via the circulation pump (130A), and passes through an ozone injector stage (130F3) that pulls ozone ($O_3$) generated by the ozone generator (130F1) into the flow of water, thereby ozonating the water. According to a preferred embodiment of the present disclosure, the ozone injector stage (130F3) is a pressure differential injector. According to a further preferred embodiment of the present disclosure, such pressure differential injector is a Venturi injector manufactured by Mazzei Injector Company, LLC (Bakersfield, Calif., USA).

Figure 5A:
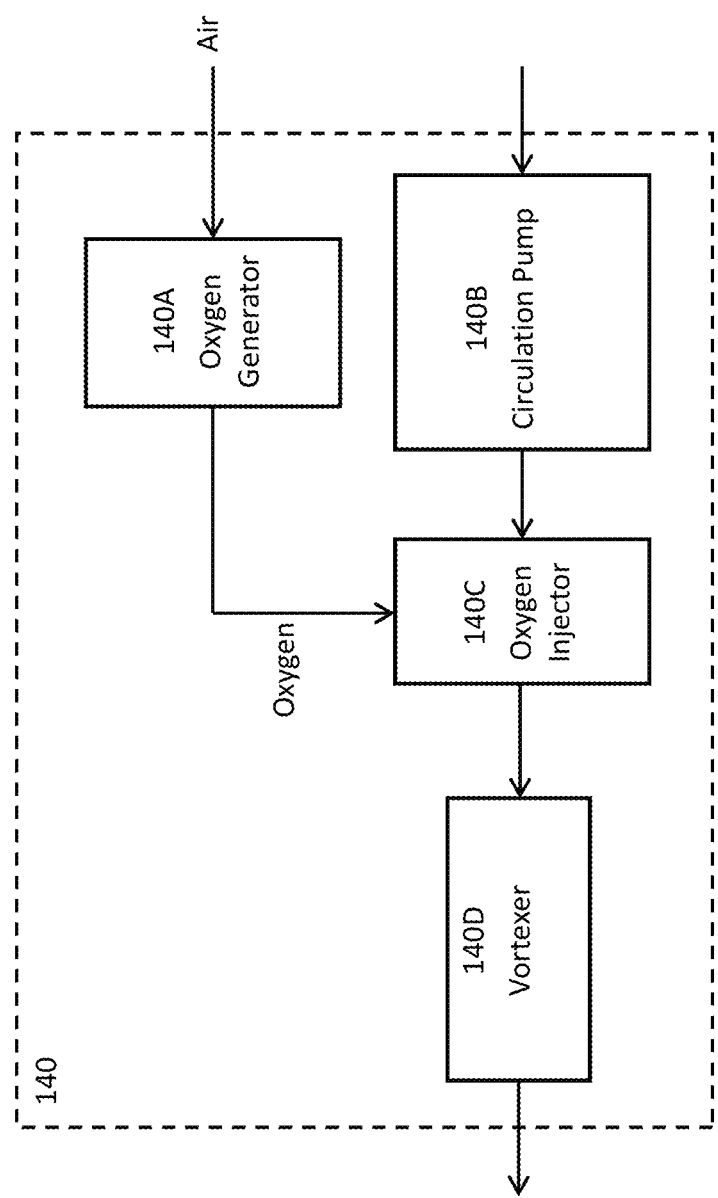
FIG. 5A illustrates details, according to the present disclosure, of the oxygenation loop of the water system depicted in FIG. 1. As can be seen in FIG. 5A, the oxygenation loop comprises an oxygen generator stage, a circulation pump, an oxygen injector stage, and a vortexer stage.

FIG. 5A illustrates details, according to the present disclosure, of the oxygenation loop (140) of the water system depicted in FIG. 1. The oxygenation loop (140) forms a closed loop that is configured to raise and sustain predetermined high levels of dissolved oxygen to the already nanopurified water in the soaking vessel (120). As can be seen in FIG. 5A, the oxygen loop (140) may comprise a circulation pump (e.g., high velocity pump) (140B) configured to push water from the soaking vessel (120) into the oxygenation loop (140), an oxygen generator (140A) configured to generate oxygen for mixing with a water flow generated by the circulation pump (140B), an oxygen injector (140C) configured to inject the generated oxygen into the flow of water, and a vortexer stage (140D) configured to affect hydrodynamic properties of the water-oxygen mixture so that oxygen bubbles, including nanobubbles, and voids (i.e., spacing between molecules and/or clusters of water), including nano-voids (or nano-sized voids, where nano represents $10^{-9}$ meters), are formed in the water, thereby increasing the dissolved oxygen concentration of the water by filling the voids, including the nano-voids, with the oxygen bubbles, including the nanobubbles.

With continued reference to FIG. 5A, the circulation pump (140B) may be a high velocity pump configured to provide a high velocity flow rate of the water to allow purified (about 95%) oxygen gas to be efficiently injected, via the oxygen injector stage (140C), and dissolved, via the vortexer stage (140D), into the flow of water.

With further reference to FIG. 5A, a high velocity flow rate of oxygen rich water is fed to the vortexer stage (140D) that is placed immediately after, and at close proximity to, the oxygen injector (140C).

As shown in FIG. 5B, according to an embodiment of the present disclosure, the oxygen injector (140C) may comprise a tubular conduit (140C1), such as, for example, a pipe, made of a metal (e.g., stainless steel, copper, etc.) or a polymer based material (e.g., PVC or other), having one end coupled to the oxygen generator stage (140A) for receiving the oxygen, and having the other end immersed in the water having a flow that is provided through the high velocity circulation pump (140B), wherein the end immersed in the water includes a longitudinal portion of the tubular conduit (140C1) that is substantially parallel to the flow of water. As shown in FIG. 5B, an optional high pressure check valve (140C5) may be provided at an inlet of the pipe (140C1) in order to prevent backflow of the water into the oxygen generator (140A).

With further reference to FIG. 5B, the oxygen supplied through the oxygen injector device (140C) may enter a channel (140C3) conducting the water in a direction perpendicular to the flow of the water, for example, through a Tee fitting (140C4). The tubular conduit (140C1) of the oxygen injector device (140C) may bend at an angle such that the injected oxygen is generally according to a direction that is against the flow of the water, or, as shown in FIG. 5B, it may bend at an angle such that the injected oxygen is generally according to a direction that is substantially parallel to the flow of the water. The tubular conduit (140C1) may have an open-ended edge (140C2) for injecting the oxygen into the flow of water. The open-ended edge (140C2) can be provided by a cut of the tubular conduit (140C1) in a diagonal fashion with respect to the flow of the oxygen (e.g., 30° to 60°) so to increase a surface area at a plane where oxygen meets the water. Alternatively, the open-ended edge (140C2) may be provided by a cut of the tubular conduit (140C1) in a substantially perpendicular fashion with respect to the flow of the oxygen (e.g., 85° to 95°) so to reduce the surface area at the plane where oxygen meets the water.

According to an exemplary embodiment of the present disclosure, the vortexer stage (140D) depicted in FIG. 5A may provide a spiral shaped path along a longitudinal direction of the device to provide a spinning effect to the high velocity flow rate of oxygen rich water. The spiral shaped path may effectively increase the high velocity flow rate of the oxygen rich water and cause formation of about 95% 'pure' oxygen nanobubbles within the water, which in turn stabilize in the water to increase the dissolved oxygen concentration of the water.

According to one exemplary embodiment of the present disclosure, the vortexer stage (140D) provides the spiral shaped path by way of physical structures that confine the oxygen rich water to within a substantially spiral shaped physical path created by the physical structures. Such physical structures may be provided by way of one or more twisted pipes along the longitudinal direction of the vortexer stage (140D).

Figure 5C:
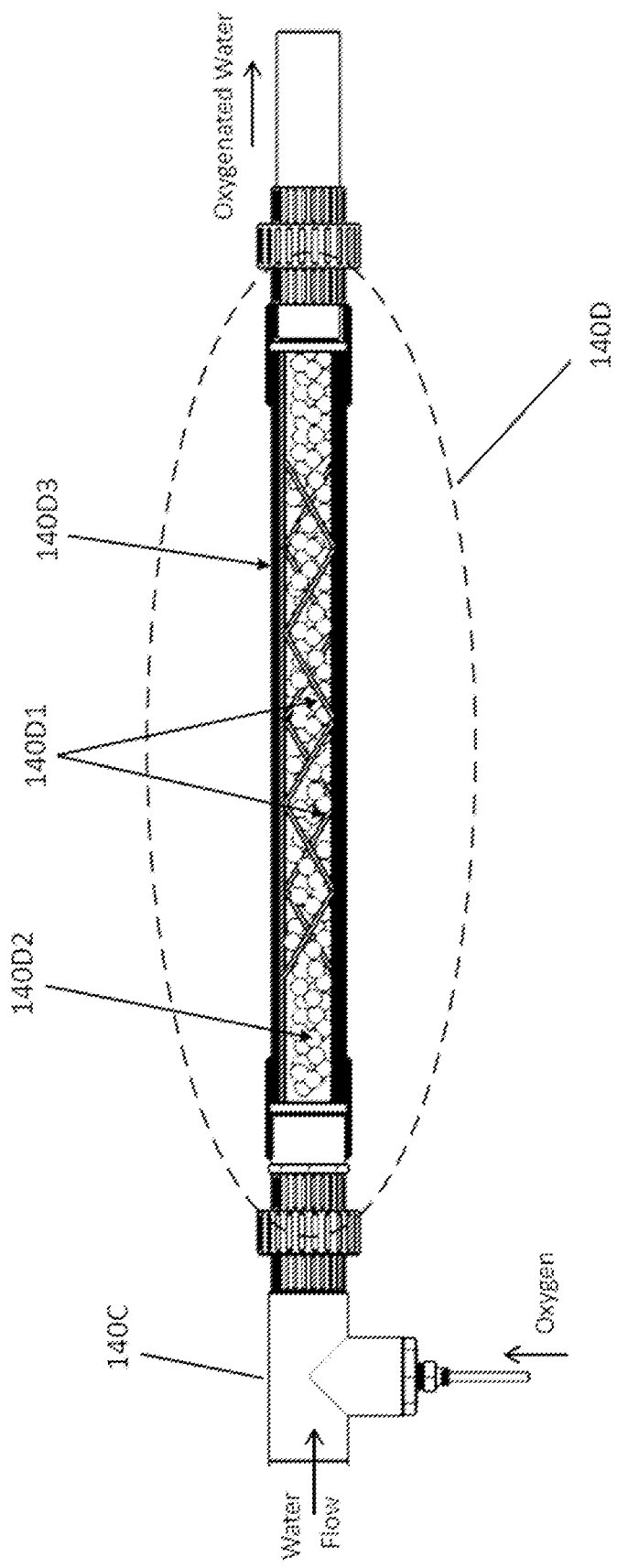
FIG. 5C illustrates details of a vortexer stage, according to an embodiment of the present disclosure, used in the oxygenation loop depicted in FIG. 5A.

Alternatively, and according to a preferred embodiment of the present disclosure depicted in FIG. 5C, a spiraling effect of the water flow through the vortexer stage (140D) can be provided via two or more series of interconnected baffles (140D1) placed inside of a chamber (140D3) along the longitudinal direction of the vortexer stage (140D), where the two or more series of interconnected baffles (140D1) are configured, in combination, to substantially guide the flow of water inside the chamber (140D3) according to a spiral shaped path. In such configuration, the water is not confined to walls of a spiral shaped physical structure, but rather to the inner wall of the chamber (140D3) and is further diverted by the series of interconnected baffles (140D1) according to a spiral shaped flow path.

According to a further preferred embodiment of the present disclosure, the vortexer stage (140D) may include rose quartz crystal spheres that are seated along the spiral shaped path of the vortexer stage, configured to energize the water. As a result, high level oxygen enriched, rose quartz energized water is returned to the soaking vessel (120). Dissolved oxygen concentration in the water of the soaking vessel (120) may be kept at a constant elevated level (e.g., between 10 mg/L and 50 mg/L) through a closed loop control system that includes a dissolved oxygen concentration meter and membrane sensor. The meter and membrane sensor may work together to start and stop the oxygenation loop (140) any time the dissolved oxygen concentration falls or rises above two preset set points measured, for example, in parts per million (ppm), or mg/L. Alternatively, the enriched oxygen level may be controlled in an open loop fashion through a timer that controls an ON/OFF duty cycle of the oxygenation loop (140).

With further reference to the rose quartz crystal spheres (e.g., 140D2 of FIG. 5C), according to an exemplary embodiment of the present disclosure, such rose quartz crystal spheres can have a diameter between 15 mm and 20 mm (0.5 inches-1.0 inches). Mechanical vibration of the crystal spheres due to the high velocity flow of water through the chamber (140D3) of the vortexer stage (140D) can create collisions between the crystal spheres and bubbles of oxygen within the water, therefore resulting in smaller size bubbles to further promote generation of nanobubbles. Furthermore, frequencies associated to said mechanical vibration can cause a greater variation in water pressure through the vortexing device (135A3) which can result in voids, including nano-voids, in the water which can be filled with the smaller size bubbles, including nanobubbles, of oxygen.

Figure 5D:
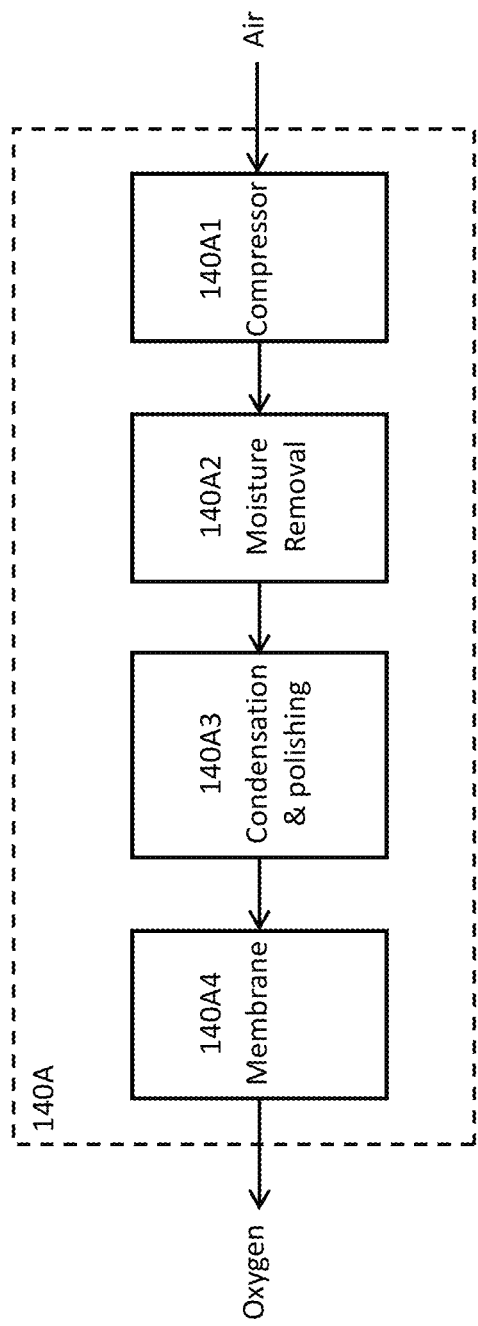
FIG. 5D illustrates details, according to the present disclosure, of the oxygen generator stage depicted in FIG. 5A.

A person skilled in the art would know of various implementations examples of the oxygen generator (140A) depicted in FIG. 5A, including implementations using an oxygen concentrator and/or a compressor, that intake air and generate 'pure' (e.g., about 95%) oxygen gas therefrom. A preferred exemplary embodiment according to the present disclosure of the oxygen generator (140A) is shown in FIG. 5D. As can be seen in FIG. 5D, air intake to the oxygen generator (140A) is provided through a compressor (140A1) which is the driving force that starts the dissolve oxygen process provided by the oxygenation loop (140) of FIGS. 1 and 5A. According to a preferred embodiment of the present disclosure, the compressor (140A1) is an oil-less scroll compressor (also known in the art as a spiral compressor) so to reduce any risk of oil contamination through the oxygenation loop (140). The scroll compressor (140A1) is configured to provide adequate air and pressure for generation of 'pure' oxygen (e.g., about 95%) in quantities enough to sustain a desired concentration of dissolved oxygen (e.g., 10 ppm-50 ppm) in the water of the soaking vessel (120).

With further reference to FIG. 5D, compressed air from the (scroll) compressor (140A1) is fed to a moisture removal stage (140A2) which is configured to capture and remove any heavy moisture that may disrupt the oxygen generation process in the following stages of the oxygenation loop (140). According to an exemplary embodiment, the moisture removal stage (140A2) may include a heavy moisture tank to contain the captured heavy moisture.

Compressed and heavy moisture free air provided by the stages (140A1, 140A2) of the oxygen generator stage (140A) depicted in FIG. 5D is fed to a condensation and polishing stage (140A3) that is configured to remove any oil and/or condensation that may be present in the air, as well as polishing (e.g., filtering) the air, so to provide filtered air, with particles size of less than 3 nano-meters ($10^{-9}$ meters), to an oxygen membrane (140A4). The oxygen membrane (140A4) generates 'pure' oxygen gas (e.g., about 95%) at in quantities enough to sustain a desired concentration of dissolved oxygen in the water (e.g., 10 ppm-50 ppm).

Based on the above description of the functional blocks (110, 130, 140), water delivered by the self-contained configuration of the water system (100) depicted in FIG. 1, is softened, reverse osmosis, nano-purified, ionized, oxygen enriched, rose quartz energized, remineralized alkaline water.

FIGS. 6A and 6B respectively illustrate a front view (600A) and a back view (600B) of an exemplary assembly of the functional blocks (110, 130, 140) of the self-contained configuration (100) depicted in FIG. 1 with further details, including exemplary dimensional details. As can be seen in FIGS. 6A and 6B, a baseplate (610) and a frame structure (630) are used to provide structural rigidity to the assembly. Although not shown in FIGS. 6A, 6B, a footprint of the self-contained configuration (200) as defined by the baseplate (610) having a substantially rectangular shape, can be provided by a first side of the baseplate (610) being about 72 inches (less than 1.85 meters) and a second side of the baseplate (610) being about 46.5 inches (less than 1.20 meters).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

I claim:

1. A self-contained water system, comprising:
   a water inlet;
   a water outlet;
   a water nano-purification pre-treatment stage configured to receive water from the water inlet and generate pre-treated water having a total dissolved solids (TDS) of about 4 parts per million (ppm);
   a water remineralization stage configured to receive the pretreated water and generate therefrom mineralized water having mineral content according to a desired level that is provided to a soaking vessel;
   a water sanitizer stage configured to receive water from the soaking vessel and provide sanitized water to the soaking vessel; and
   a water oxygenation stage configured to receive water from the soaking vessel and provide oxygenated water to the soaking vessel, the water oxygenation stage further configured to control a dissolved oxygen concentration of the water provided to the soaking vessel from a low value equal to 10 mg per liter, to a high value equal to 50 mg per liter, and to any value between the low value and the high value.

2. The self-contained water system according to claim 1, wherein the water oxygenation stage is configured to generate voids in the water, at a molecular level, which can be filled with oxygen molecules to provide the high value of the dissolved oxygen concentration.

3. The self-contained water system according to claim 2, wherein the voids are generated through frequencies associated to mechanical vibration of crystal spheres provided along a flow path of the water through the water oxygenation stage.

4. The self-contained water system according to claim 3, wherein the crystal spheres are rose quartz crystal spheres.

5. The self-contained water system according to claim 2, wherein the voids comprise nano-sized voids which can be filled with nano-sized oxygen bubbles having a diameter smaller than 100 nano-meters.

6. The self-contained water system according to claim 3, wherein the water oxygenation stage comprises:
   a high velocity pump that is configured to receive the water from the soaking vessel and generate therefrom a high velocity flow of water; and
   a vortexer device configured to:
   a) receive the high velocity flow of water;
   b) receive oxygen gas purified to about 95%;
   c) inject the oxygen gas in the high velocity flow of water to generate a high velocity flow of oxygen rich water; and
   d) provide a spiral shaped flow path of the high velocity flow of oxygen rich water comprising the crystal spheres.

7. The self-contained water system according to claim 6, wherein the water oxygenation stage further comprises an oxygen generator configured to receive air and generate therefrom the oxygen gas of about 95% purity, the oxygen generator comprising:

an oil-less scroll compressor configured to receive the air and output compressed air;
a moisture removal stage configured to remove heavy moisture from the air;
a condensation and polishing stage configured to remove, from the compressed air, suspended oil, condensation, and any particle having a size down to 3 nano-meters; and
an oxygen membrane configured to extract oxygen from the compressed air.

8. The self-contained water system according to claim 1, wherein the water nano-purification pre-treatment stage comprises, in sequence with respect to the water received from the water inlet:
at least one multi-media tank comprising:
a water softening pretreatment filtration media;
a sediment filtration media; and
a filtration media comprising one or more of coconut carbon, kinetic degradation fluxion (KDF) carbon and catalytic carbon; and
a reverse osmosis filter system comprising a pump configured to push water through a membrane of the reverse osmosis filter system,
wherein the pump of the reverse osmosis filter system is activated according to a detected water level of the soaking vessel.

9. The self-contained water system according to claim 8, wherein the pump of the reverse osmosis filter system is adapted to fill the soaking vessel in a time less than one hour for a soaking vessel capacity substantially equal to 2850 liters.

10. The self-contained water system according to claim 1, wherein the water sanitizer stage comprises, in sequence with respect to the water received from the soaking vessel:
a circulation pump configured to receive the water from the soaking vessel and push the water to the soaking vessel through stages of the water sanitizer stage at a desired flow velocity;
a filtration stage comprising a first tank filled with a catalytic oxide media, and a second tank filled with carbon media sediment filtration;
a hydrogen peroxide ($H_2O_2$) injection stage configured to inject an aqueous solution of $H_2O_2$ into the water;
an ultra violet (UV) treatment stage configured to radiate the water with a high energy UV light;
an ozonation stage configured to generate ozone ($O_3$) gas; and
a pressure differential injector configured to inject the ozone gas into the water.

11. The self-contained water system according to claim 10, wherein treatment of water through the water sanitizer stage is continuous.

12. The self-contained water system according to claim 10, wherein the pressure differential injector is a Venturi injector.

13. The self-contained water system according to claim 10, further comprising an ozone air gap stage placed between the ozonation stage and the pressure differential injector, configured to remove and separate moisture from generated ozone ($O_3$).

14. The self-contained water system according to claim 10, wherein the water sanitizer stage is adapted to sanitize a soaking vessel with a capacity of 2850 liters in about 40 minutes.

15. The self-contained water system according to claim 1, wherein the water remineralization stage comprises a remineralization alkaline media tank configured to provide the desired level of mineral content to the water and further adjust a pH level of the water provided to the water outlet.

16. The self-contained water system according to claim 1, further comprising a baseplate for mounting of the stages, the base plate being of a rectangular shape with a length of a first side being less than 1.85 meters, and a length of a second side being less than 1.20 meters, wherein a footprint of the self-contained water system is represented by the baseplate.

17. A method for water treatment in a self-contained water system, the method comprising:
a) upon detection of a pressure demand from a soaking vessel of the self-contained water system:
a1) feeding water from an inlet of the self-contained water system to a water nano-purification pre-treatment stage of the self-contained water system configured to receive water from the water inlet and provide pre-treated water having a total dissolved solids (TDS) of about 4 parts per million (ppm);
a2) feeding the pre-treated water to the soaking vessel through a water remineralization stage of the self-contained water system that is configured to provide to the water a mineral content according to a desired level;
b) circulating the pre-treated and remineralized water from the soaking vessel through a water sanitizer stage of the self-contained water system configured to receive water from the soaking vessel and provide sanitized water to the soaking vessel; and
c) circulating the pre-treated, remineralized, and sanitized water from the soaking vessel through a water oxygenation stage of the self-contained water system configured to receive water from the soaking vessel and provide oxygenated water to the soaking vessel, the water oxygenation stage further configured to control a dissolved oxygen concentration of the water provided to the soaking vessel from a low value equal to 10 ppm, to a high value equal to 50 ppm, and to any value between the low value and the high value.

18. The method according to claim 17, wherein provision of oxygenated water by the water oxygenation stage comprises generation of oxygen via an oil-less scroll compressor.

19. The method according to claim 17, wherein the water sanitizer stage is further configured for injection of an aqueous solution of $H_2O_2$ into the water.

20. The method according to claim 17, wherein the water oxygenation stage is further configured to provide a flow path to the water that comprises rose quartz crystal spheres, wherein a flow of the water through the flow path causes said spheres to vibrate, and wherein a frequency of vibration of said spheres generates voids in the water, at a molecular level, which can be filled with oxygen molecules to provide the high value of the dissolved oxygen concentration.

* * * * *